United States Patent
Yasuda et al.

(10) Patent No.: US 11,365,305 B2
(45) Date of Patent: Jun. 21, 2022

(54) RESIN COMPOSITION, INORGANIC FILLER, DIRECT-CURRENT POWER CABLE, AND METHOD FOR PRODUCING DIRECT-CURRENT POWER CABLE

(71) Applicant: SUMITOMO ELECTRIC INDUSTRIES, LTD., Osaka (JP)

(72) Inventors: Shuhei Yasuda, Osaka (JP); Takanori Yamazaki, Osaka (JP); Akira Domoto, Osaka (JP); Yoshinao Murata, Osaka (JP); Tomohiko Katayama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 85 days.

(21) Appl. No.: 17/044,092

(22) PCT Filed: Mar. 8, 2019

(86) PCT No.: PCT/JP2019/009378
§ 371 (c)(1),
(2) Date: Sep. 30, 2020

(87) PCT Pub. No.: WO2019/202870
PCT Pub. Date: Oct. 24, 2019

(65) Prior Publication Data
US 2021/0032434 A1 Feb. 4, 2021

(30) Foreign Application Priority Data

Apr. 20, 2018 (JP) .............................. JP2018-081547
Nov. 16, 2018 (JP) .............................. JP2018-215560

(51) Int. Cl.
*H01B 3/00* (2006.01)
*C08K 3/22* (2006.01)
(Continued)

(52) U.S. Cl.
CPC .................. *C08K 3/22* (2013.01); *C08K 9/02* (2013.01); *H01B 3/441* (2013.01); *H01B 7/38* (2013.01);
(Continued)

(58) Field of Classification Search
CPC ................................. H01B 3/00; H01B 7/295
See application file for complete search history.

(56) References Cited

U.S. PATENT DOCUMENTS

2012/0315466 A1* 12/2012 Abrami .................. C09D 5/084
106/286.6
2016/0053073 A1 2/2016 Matsui
2017/0250007 A1* 8/2017 Scrima ................ C08L 23/0853

FOREIGN PATENT DOCUMENTS

EP 2922068 A1 9/2015
JP H04-368720 A 12/1992
(Continued)

OTHER PUBLICATIONS

May 28, 2019 International Search Report issued in International Patent Application No. PCT/JP2019/009378.
(Continued)

*Primary Examiner* — Chau N Nguyen
(74) *Attorney, Agent, or Firm* — Oliff PLC

(57) ABSTRACT

A resin composition including a base resin containing polyolefin, and an inorganic filler, wherein the inorganic filler includes: a core part containing $Mg(OH)_2$, and a covering part containing a plurality of MgO particles provided on an outer periphery of the core part, the content of the inorganic filler in the resin composition is 0.1 parts by mass or more and 5 parts by mass or less with respect to 100 parts by mass of the base resin; and a volume fraction of $Mg(OH)_2$ in one particle of the inorganic filler is 10% or more and less than 50%.

9 Claims, 3 Drawing Sheets

(51) Int. Cl.
*C08K 9/02* (2006.01)
*H01B 9/00* (2006.01)
*H01B 3/44* (2006.01)
*H01B 7/38* (2006.01)

(52) U.S. Cl.
CPC ....... *H01B 9/00* (2013.01); *C08K 2003/2224* (2013.01); *C08K 2201/005* (2013.01)

(56) References Cited

FOREIGN PATENT DOCUMENTS

| JP | H11-16421 A | 1/1999 |
| JP | 2015-183039 A | 10/2015 |
| JP | 2016-3174 A | 1/2016 |
| JP | 2017-122029 A | 7/2017 |
| WO | 2014/155764 A1 | 10/2014 |

OTHER PUBLICATIONS

May 28, 2019 Written Opinion issued in International Patent Application No. PCT/JP2019/009378.

Kenya Hamano. "Dehydration of Magnesium Hydroxide and Sintering Behaviour of Its Compressed Body". Journal of Ceramics Association, vol. 74, No. 5, 1966, pp. 12-20.

Aug. 27, 2020 Office Action issued in Japanese Patent Application No. 2018-215560.

\* cited by examiner

One particle of inorganic filler 0.5 μm

RESIN COMPOSITION, INORGANIC FILLER, DIRECT-CURRENT POWER CABLE, AND METHOD FOR PRODUCING DIRECT-CURRENT POWER CABLE

The present application claims priority based on Japanese Patent Application No. 2018-081547 filed on Apr. 20, 2018 and Japanese Patent Application No. 2018-215560 filed on Nov. 16, 2018, which are incorporated herein by reference in their entirety.

TECHNICAL FIELD

The present disclosure relates to a resin composition, an inorganic filler, a direct-current power cable (DC power cable), and a method for producing the DC power cable.

BACKGROUND

In recent years, solid-insulated direct-current power cables (hereinafter abbreviated as "DC power cables") have been developed for DC power transmission applications. In DC power cables, space charges are generated in the insulation layer upon application of high voltage, so that the DC characteristics (volume resistivity, DC breakdown electric field strength, space charge characteristics, and the like) of the insulation layer may be possibly reduced.

Therefore, a polar inorganic filler such as carbon black or magnesium oxide (MgO) may be sometimes added to the resin composition forming the insulation layer in order to suppress the accumulation of space charges in an insulation layer of a DC power cable (for example, Patent Document 1).

PRIOR ART DOCUMENT

Patent Document

[Patent Document 1] Japanese Patent Laid-Open Publication No. 1999-16421

SUMMARY OF THE INVENTION

According to an aspect of the present disclosure, there is provided a resin composition, including:
a base resin containing polyolefin, and
an inorganic filler,
wherein
the inorganic filler includes:
  a core part containing $Mg(OH)_2$, and
  a covering part containing a plurality of MgO particles provided on an outer periphery of the core part, and
the content of the inorganic filler in the resin composition is 0.1 parts by mass or more and 5 parts by mass or less with respect to 100 parts by mass of the base resin; and
a volume fraction of $Mg(OH)_2$ in one particle of the inorganic filler is 10% or more and less than 50%.

According to another aspect of the present disclosure, there is provided a resin composition, including:
a base resin containing polyolefin, and
an inorganic filler,
wherein
the inorganic filler includes:
  a core part containing $Mg(OH)_2$, and
  a covering part containing a plurality of MgO particles provided on an outer periphery of the core part; and
a volume resistivity of a sheet of an insulation layer is $1 \times 10^{15}$ Ω·cm or more, as measured under conditions at a temperature of 90° C. and a direct-current field of 80 kV/mm, when the sheet of the insulation layer having a thickness of 0.15 mm is formed by preparing a direct-current power cable having an insulation layer including the resin composition, and immersing the direct-current power cable in a water bath at a temperature of 40° C. for 30 days, and thereafter peeling the insulation layer of the direct-current power cable.

According to yet another aspect of the present disclosure, there is provided a resin composition, including:
a base resin containing polyolefin, and
an inorganic filler,
wherein
the inorganic filler includes:
  a core part containing $Mg(OH)_2$, and
  a covering part containing a plurality of MgO particles provided on an outer periphery of the core part; and
a dielectric breakdown electric field strength of a sheet of an insulation layer is 250 kV/mm or more, as measured under a condition at a temperature of 90° C., when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable.

According to yet another aspect of the present disclosure, there is provided a resin composition, including:
a base resin containing polyolefin, and
an inorganic filler,
wherein
the inorganic filler includes:
  a core part containing $Mg(OH)_2$, and
  a covering part containing a plurality of MgO particles provided on an outer periphery of the core part; and
a field enhancement factor FEF of a sheet of an insulation layer is less than 1.15, as obtained by the following formula (1), when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure:

$$FEF = E_1/(V_0/T) \tag{1}$$

wherein $V_0$ represents a voltage (kV) applied to the sheet, T represents a thickness (mm) of the sheet, and $E_1$ represents a maximum electric field (kV/mm) in the sheet.

According to yet another aspect of the present disclosure, there is provided a resin composition including:
a base resin containing polyolefin, and
an inorganic filler containing at least MgO,
wherein
the inorganic filler exhibits no peak derived from $Mg(OH)_2$ but a peak derived from MgO when energy spectra of photoelectrons emitted from a surface side of the inorganic filler are measured by X-ray photoelectron spectroscopy method,
whereas the inorganic filler exhibits a peak derived from $Mg(OH)_2$ when an infrared spectrum of the inorganic filler is measured by Fourier transform infrared spectroscopy method based on infrared rays penetrating the inorganic filler;

the content of the inorganic filler in the resin composition is 0.1 parts by mass or more and 5 parts by mass or less with respect to 100 parts by mass of the base resin; and a volume fraction of $Mg(OH)_2$ in one particle of the inorganic filler is 10% or more and less than 50%.

According to yet another aspect of the present disclosure, there is provided an inorganic filler including:

a core part containing $Mg(OH)_2$, and a covering part containing a plurality of MgO particles provided so as to cover an outer periphery of the core part, wherein a volume fraction of $Mg(OH)_2$ in one particle of the inorganic filler is 10% or more and less than 50%.

According to yet another aspect of the present disclosure, there is provided an inorganic filler which exhibits no peak derived from $Mg(OH)_2$ but a peak derived from MgO when energy spectra of photoelectrons emitted from a surface side of the inorganic filler are measured by X-ray photoelectron spectroscopy method, whereas the inorganic filler exhibits a peak derived from $Mg(OH)_2$ when an infrared spectrum of the inorganic filler is measured by Fourier transform infrared spectroscopy method based on infrared rays penetrating the inorganic filler;

wherein a volume fraction of $Mg(OH)_2$ in one particle of the inorganic filler is 10% or more and less than 50%.

According to yet another aspect of the present disclosure, there is provided a direct-current power cable, including:

a conductor, and an insulation layer provided on an outer periphery of the conductor;

wherein the insulation layer includes a resin composition including:

a base resin containing polyolefin, and an inorganic filler;

the inorganic filler includes:

a core part containing $Mg(OH)_2$, and a covering part containing a plurality of MgO particles provided on an outer periphery of the core part; and the content of the inorganic filler in the resin composition is 0.1 parts by mass or more and 5 parts by mass or less with respect to 100 parts by mass of the base resin; and a volume fraction of $Mg(OH)_2$ in one particle of the inorganic filler is 10% or more and less than 50%.

According to yet another aspect of the present disclosure, there is provided a direct-current power cable, including:

a conductor, and an insulation layer provided on an outer periphery of the conductor;

wherein the insulation layer includes a resin composition including:

a base resin containing polyolefin, and an inorganic filler;

the inorganic filler includes:

a core part containing $Mg(OH)_2$, and a covering part containing a plurality of MgO particles provided on an outer periphery of the core part; and a volume resistivity of a sheet of an insulation layer is $1\times10^{15}$ Ω·cm or more, as measured under conditions at a temperature of 90° C. and a direct-current field of 80 kV/mm, when the sheet of the insulation layer having a thickness of 0.15 mm is formed by immersing the direct-current power cable in a water bath at a temperature of 40° C. for 30 days, and thereafter peeling the insulation layer of the direct-current power cable.

According to yet another aspect of the present disclosure, there is provided a direct-current power cable, including:

a conductor, and an insulation layer provided on an outer periphery of the conductor;

wherein the insulation layer includes a resin composition including:

a base resin containing polyolefin, and an inorganic filler;

the inorganic filler includes:

a core part containing $Mg(OH)_2$, and a covering part containing a plurality of MgO particles provided on an outer periphery of the core part; and a dielectric breakdown electric field strength of a sheet of an insulation layer is 250 kV/mm or more, as measured under a condition at a temperature of 90° C., when the sheet of the insulation layer having a thickness of 0.15 mm is formed by immersing the direct-current power cable in a water bath at a temperature of 40° C. for 30 days, and thereafter peeling the insulation layer of the direct-current power cable.

According to yet another aspect of the present disclosure, there is provided a direct-current power cable, including:

a conductor, and an insulation layer provided on an outer periphery of the conductor;

wherein the insulation layer includes a resin composition including:

a base resin containing polyolefin, and an inorganic filler;

the inorganic filler includes:

a core part containing $Mg(OH)_2$, and a covering part containing a plurality of MgO particles provided on an outer periphery of the core part; and a field enhancement factor FEF of a sheet of an insulation layer is less than 1.15, as obtained by the above-described formula (1) wherein $V_0$ represents a voltage (kV) applied to the sheet, T represents a thickness (mm) of the sheet, and $E_1$ represents a maximum electric field (kV/mm) in the sheet, when the sheet of the insulation layer having a thickness of 0.15 mm is formed by immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure.

According to yet another aspect of the present disclosure, there is provided a direct-current power cable, including:

a conductor, and an insulation layer provided on an outer periphery of the conductor;

wherein the insulation layer includes a resin composition including:

a base resin containing polyolefin, and an inorganic filler containing at least MgO;

the inorganic filler exhibits no peak derived from $Mg(OH)_2$ but a peak derived from MgO when energy spectra of photoelectrons emitted from a surface side of the inorganic filler are measured by X-ray photoelectron spectroscopy method, whereas the inorganic filler exhibits a peak derived from $Mg(OH)_2$ when an infrared spectrum of the inorganic filler is measured by Fourier transform infrared spectroscopy method based on infrared rays penetrating the inorganic filler; and a volume fraction of $Mg(OH)_2$ in one particle of the inorganic filler is 10% or more and less than 50%.

According to yet another aspect of the present disclosure, there is provided a method for producing a direct-current power cable, including:

preparing a resin composition including a base resin containing polyolefin, and an inorganic filler; and forming an insulation layer on an outer periphery of a conductor using the resin composition, wherein the preparation of the resin composition includes:

preparing the inorganic filler including a core part containing $Mg(OH)_2$, and a covering part containing a plurality of MgO particles provided on an outer periphery of the core part, and mixing the resin composition so that a content of the inorganic filler in the resin composition is 0.1 parts by mass or more and 5 parts by mass or less with respect to 100 parts by mass of the base resin; and, in the preparation of the inorganic filler, a volume fraction of $Mg(OH)_2$ in one particle of the inorganic filler is 10% or more and less than 50%.

DESCRIPTION OF THE EMBODIMENTS

Figure 1:
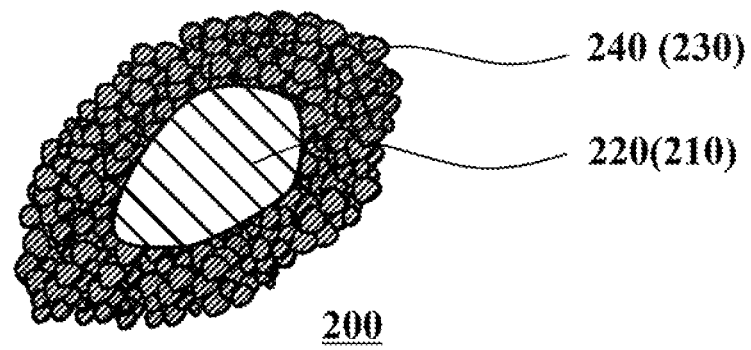
FIG. 1 is a schematic sectional view of an inorganic filler according to an embodiment of the present disclosure.

Problem to be Solved by the Disclosure

An object of the present disclosure is to provide a technique that can suppress a degradation in the DC characteristics of an insulation layer due to long-term immersion in water.

Advantageous Effect of the Disclosure

According to the present disclosure, a degradation in the DC characteristics of an insulation layer due to long-term immersion in water can be suppressed.

Description of the Embodiment of the Disclosure

<Knowledges Obtained by the Inventors>

First, an outline of the knowledges obtained by the inventors will be described.

Since the above-described inorganic fillers are dispersed in the insulation layer, the space charges generated in the insulation layer can be trapped by the respective inorganic fillers. Thereby, the local accumulation of space charges in the insulation layer can be suppressed.

As the inorganic filler added to the insulation layer, for example, MgO formed by baking magnesium hydroxide ($Mg(OH)_2$) may be used.

The ability of $Mg(OH)_2$ to trap the space charges is lower than that of MgO. For this reason, conventionally, $Mg(OH)_2$ as a raw material has been completely baked in order to reduce the content of $Mg(OH)_2$ in the inorganic filler. The inorganic filler formed by completely baking $Mg(OH)_2$ is hereinafter referred to as "completely baked filler".

However, as a result of intensive studies, the inventors found a novel challenge that DC characteristics of an insulation layer of a DC power cable in which a completely baked filler is added in the insulation layer may possibly be degraded when immersed in water for a long period of time.

In a completely baked filler, since $Mg(OH)_2$ is completely baked during a production process, the $Mg(OH)_2$ is entirely converted to MgO. At this time, a smooth surface corresponding to the MgO crystal surface is formed on the surface of the completely baked filler.

When the DC power cable in which the completely baked filler is added in the insulation layer is immersed in water for a long period of time, the water that permeates into the insulation layer from the surface side of the DC power cable is adsorbed on the surface of the completely baked filler, to convert MgO forming the surface of the completely baked filler into $Mg(OH)_2$. At this time, since the surface of the completely baked filler is smooth as described above, water easily propagates across the entire surface of the completely baked filler, and there is a possibility that the entire surface is rapidly converted into $Mg(OH)_2$.

When the entire surface of the completely baked filler is converted into $Mg(OH)_2$, the space charge cannot be trapped sufficiently by the surface of the completely baked filler due to low ability of $Mg(OH)_2$ to trap the space charges. Therefore, there is a possibility of local accumulation of space charges in the insulation layer, resulting in a degradation in the DC characteristics of the insulation layer.

The present disclosure is based on the above-described challenges found by the inventors.

Embodiments of the Disclosure

Next, embodiments of the present disclosure will be listed and described.

[1] A resin composition according to an aspect of the present disclosure is:

a resin composition including:
a base resin containing polyolefin, and
an inorganic filler,
wherein
the inorganic filler includes:
a core part containing $Mg(OH)_2$, and
a covering part containing a plurality of MgO particles provided on an outer periphery of the core part, and
the content of the inorganic filler in the resin composition is 0.1 parts by mass or more and 5 parts by mass or less with respect to 100 parts by mass of the base resin; and a volume fraction of $Mg(OH)_2$ in one particle of the inorganic filler is 10% or more and less than 50%.

This configuration makes it possible to suppress a degradation in the DC characteristics of the insulation layer due to long-term immersion in water.

[2] A resin composition according to another aspect of the present disclosure is:
a resin composition, including:
a base resin containing polyolefin, and
an inorganic filler,
wherein
the inorganic filler includes:
a core part containing $Mg(OH)_2$, and
a covering part containing a plurality of MgO particles provided on an outer periphery of the core part, and
a volume resistivity of a sheet of an insulation layer is $1 \times 10^{15}$ Ω·cm or more, as measured under conditions at a temperature of 90° C. and a direct-current field of 80 kV/mm, when the sheet of the insulation layer having a thickness of 0.15 mm is formed by preparing a direct-current power cable having an insulation layer including the resin composition, and immersing the direct-current power cable in a water bath at a temperature of 40° C. for 30 days, and thereafter peeling the insulation layer of the direct-current power cable.

This configuration also makes it possible to suppress a degradation in the DC characteristics of the insulation layer due to long-term immersion in water.

[3] A resin composition according to yet another aspect of the present disclosure is:
a resin composition, including:
a base resin containing polyolefin, and
an inorganic filler,
wherein
the inorganic filler includes:
a core part containing $Mg(OH)_2$, and
a covering part containing a plurality of MgO particles provided on an outer periphery of the core part, and
a dielectric breakdown electric field strength of a sheet of an insulation layer is 250 kV/mm or more, as measured under a condition at a temperature of 90° C., when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable.

This configuration also makes it possible to suppress a degradation in the DC characteristics of the insulation layer due to long-term immersion in water.

[4] A resin composition according to yet another aspect of the present disclosure is:
a resin composition, including:
a base resin containing polyolefin, and
an inorganic filler,
wherein
the inorganic filler includes:
a core part containing $Mg(OH)_2$, and
a covering part containing a plurality of MgO particles provided on an outer periphery of the core part, and
a field enhancement factor FEF of a sheet of an insulation layer is less than 1.15, as obtained by the following formula (1), when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure:

$$FEF = E_1/(V_0/T) \tag{1}$$

wherein $V_0$ represents a voltage (kV) applied to the sheet, T represents a thickness (mm) of the sheet, and $E_1$ represents a maximum electric field (kV/mm) in the sheet.

This configuration also makes it possible to suppress a degradation in the DC characteristics of the insulation layer due to long-term immersion in water.

[5] In the resin composition according to any one of [1] to [4],
a surface of the covering part may have irregularities corresponding to external shapes of the plurality of MgO particles.

This configuration makes it possible to delay the conversion from MgO into $Mg(OH)_2$ due to water that permeates into the insulation layer when the DC power cable is immersed in water for a long period of time.

[6] A resin composition according to still yet another aspect of the present disclosure is:
a resin composition including:
a base resin containing polyolefin, and
an inorganic filler containing at least MgO,
wherein
the inorganic filler exhibits no peak derived from $Mg(OH)_2$ but a peak derived from MgO when energy spectra of photoelectrons emitted from a surface side of the inorganic filler are measured by X-ray photoelectron spectroscopy method,
whereas the inorganic filler exhibits a peak derived from $Mg(OH)_2$ when an infrared spectrum of the inorganic filler is measured by Fourier transform infrared spectroscopy method based on infrared rays penetrating the inorganic filler;
the content of the inorganic filler in the resin composition is 0.1 parts by mass or more and 5 parts by mass or less with respect to 100 parts by mass of the base resin; and
a volume fraction of $Mg(OH)_2$ in one particle of the inorganic filler is 10% or more and less than 50%.

This configuration also makes it possible to suppress a degradation in the DC characteristics of the insulation layer due to long-term immersion in water.

[7] In the resin composition according to any one of [1] to [6],
the inorganic filler may be inorganic powder obtained by baking $Mg(OH)_2$ as a raw material.

Thereby, the inorganic filler including a core part and a covering part can be easily formed.

[8] In the resin composition according to any one of [1] to [7],
a mean volume diameter of the inorganic filler is 5 μm or less.

Thereby, the effect of improving the DC characteristics by the inorganic filler can be stably obtained.

[9] The inorganic filler according to yet another aspect of the present disclosure includes:
a core part containing $Mg(OH)_2$, and
a covering part containing a plurality of MgO particles provided on an outer periphery of the core part,
wherein a volume fraction of $Mg(OH)_2$ in one particle of the inorganic filler is 10% or more and less than 50%.

This configuration makes it possible to suppress a degradation in the DC characteristics of the insulation layer due to long-term immersion in water.

[10] The inorganic filler according to yet another aspect of the present disclosure exhibits no peak derived from $Mg(OH)_2$ but a peak derived from MgO when energy spectra of photoelectrons emitted from a surface side of the inorganic filler are measured by X-ray photoelectron spectroscopy method, whereas the inorganic filler exhibits a peak derived from $Mg(OH)_2$ when an infrared spectrum of the inorganic filler is measured by Fourier transform infrared spectroscopy method based on infrared rays penetrating the inorganic filler;

wherein a volume fraction of $Mg(OH)_2$ in one particle of the inorganic filler is 10% or more and less than 50%.

This configuration also makes it possible to suppress a degradation in the DC characteristics of the insulation layer due to long-term immersion in water.

[11] The direct-current power cable according to yet another aspect of the present disclosure is
 a direct-current power cable, including:
  a conductor, and
  an insulation layer provided on an outer periphery of the conductor;
 wherein
 the insulation layer includes a resin composition including:
  a base resin containing polyolefin, and
  an inorganic filler;
 the inorganic filler includes:
  a core part containing $Mg(OH)_2$, and
  a covering part containing a plurality of MgO particles provided on an outer periphery of the core part; and
 the content of the inorganic filler in the resin composition is 0.1 parts by mass or more and 5 parts by mass or less with respect to 100 parts by mass of the base resin; and
 a volume fraction of $Mg(OH)_2$ in one particle of the inorganic filler is 10% or more and less than 50%.

This configuration makes it possible to suppress a degradation in the DC characteristics of the insulation layer due to long-term immersion in water.

[12] The direct-current power cable according to yet another aspect of the present disclosure is
 a direct-current power cable, including:
  a conductor, and
  an insulation layer provided on an outer periphery of the conductor;
 wherein
 the insulation layer includes a resin composition including:
  a base resin containing polyolefin, and
  an inorganic filler;
 the inorganic filler includes:
  a core part containing $Mg(OH)_2$, and
  a covering part containing a plurality of MgO particles provided on an outer periphery of the core part; and
 a volume resistivity of a sheet of an insulation layer is $1\times10^{15}$ $\Omega\cdot$cm or more, as measured under conditions at a temperature of 90° C. and a direct-current field of 80 kV/mm, when the sheet of the insulation layer having a thickness of 0.15 mm is formed by immersing the direct-current power cable in a water bath at a temperature of 40° C. for 30 days, and thereafter peeling the insulation layer of the direct-current power cable.

This configuration also makes it possible to suppress a degradation in the DC characteristics of the insulation layer due to long-term immersion in water.

[13] The direct-current power cable according to yet another aspect of the present disclosure is
 a direct-current power cable, including:
  a conductor, and
  an insulation layer provided on an outer periphery of the conductor;
 wherein
 the insulation layer includes a resin composition including:
  a base resin containing polyolefin, and
  an inorganic filler;
 the inorganic filler includes:
  a core part containing $Mg(OH)_2$, and
  a covering part containing a plurality of MgO particles provided on an outer periphery of the core part; and
 a dielectric breakdown electric field strength of a sheet of an insulation layer is 250 kV/mm or more, as measured under a condition at a temperature of 90° C., when the sheet of the insulation layer having a thickness of 0.15 mm is formed by immersing the direct-current power cable in a water bath at a temperature of 40° C. for 30 days, and thereafter peeling the insulation layer of the direct-current power cable.

This configuration also makes it possible to suppress a degradation in the DC characteristics of the insulation layer due to long-term immersion in water.

[14] The direct-current power cable according to yet another aspect of the present disclosure is
 a direct-current power cable, including:
  a conductor, and
  an insulation layer provided on an outer periphery of the conductor;
 wherein
 the insulation layer includes a resin composition including:
  a base resin containing polyolefin, and
  an inorganic filler;
 the inorganic filler includes:
  a core part containing $Mg(OH)_2$, and
  a covering part containing a plurality of MgO particles provided on an outer periphery of the core part; and
 a field enhancement factor FEF of a sheet of an insulation layer is less than 1.15, as obtained by the above-described formula (1) wherein $V_0$ represents a voltage (kV) applied to the sheet, T represents a thickness (mm) of the sheet, and $E_1$ represents a maximum electric field (kV/mm) in the sheet, when the sheet of the insulation layer having a thickness of 0.15 mm is formed by immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure.

This configuration also makes it possible to suppress a degradation in the DC characteristics of the insulation layer due to long-term immersion in water.

[15] The direct-current power cable according to yet another aspect of the present disclosure is
 a direct-current power cable, including:
  a conductor, and
  an insulation layer provided on an outer periphery of the conductor;

wherein
the insulation layer includes a resin composition including:
a base resin containing polyolefin, and
an inorganic filler containing at least MgO;
the inorganic filler exhibits no peak derived from $Mg(OH)_2$ but a peak derived from MgO when energy spectra of photoelectrons emitted from a surface side of the inorganic filler are measured by X-ray photoelectron spectroscopy method,
whereas the inorganic filler exhibits a peak derived from $Mg(OH)_2$ when an infrared spectrum of the inorganic filler is measured by Fourier transform infrared spectroscopy method based on infrared rays penetrating the inorganic filler; and
a volume fraction of $Mg(OH)_2$ in one particle of the inorganic filler is 10% or more and less than 50%.

This configuration also makes it possible to suppress a degradation in the DC characteristics of the insulation layer due to long-term immersion in water.

[16] A method for producing the direct-current power cable according to yet another aspect of the present disclosure includes:
preparing a resin composition including a base resin containing polyolefin, and an inorganic filler; and
forming an insulation layer including the resin composition on an outer periphery of a conductor,
wherein
the preparation of the resin composition includes:
preparing the inorganic filler including a core part containing $Mg(OH)_2$, and a covering part containing a plurality of MgO particles provided on an outer periphery of the core part, and
mixing the resin composition so that a content of the inorganic filler in the resin composition is 0.1 parts by mass or more and 5 parts by mass or less with respect to 100 parts by mass of the base resin; and
in the preparation of the inorganic filler,
a volume fraction of $Mg(OH)_2$ in one particle of the inorganic filler is 10% or more and less than 50%.

This configuration makes it possible to provide a DC power cable in which a degradation in the DC characteristics of the insulation layer due to long-term immersion in water is suppressed.

Details of Embodiment of the Disclosure

Next, an embodiment of the present disclosure will be described below with reference to the drawings.

One Embodiment of the Disclosure (1) Resin Composition

The resin composition of this embodiment is a material forming an insulation layer 130 of a DC power cable 10 described later, and includes, for example, a base resin, an inorganic filler 200, a crosslinking agent, and other additives.

(Base Resin)

A base resin (base polymer) means a resin component forming the main component of the resin composition. The base resin of this embodiment contains, for example, polyolefin. Examples of polyolefin forming the base resin include polyethylene, polypropylene, ethylene-α-olefin copolymer, thermoplastic elastomer including ethylene propylene rubber dispersed in or copolymerized with polypropylene, and the like. Among them, polyethylene is preferred. Two or more of them may be used in combination.

Examples of the polyethylene forming the base resin include low density polyethylene (LDPE), medium density polyethylene (MDPE), high density polyethylene (HDPE), and the like. In addition, the polyethylene may be either linear or branched, for example.

Further, the base resin may contain, for example, modified polyolefin in which a polar group is grafted onto polyolefin, or copolymer of olefin and polar monomer. Thereby, the compatibility (adhesion) of the inorganic filler 200 having polarity with the base resin can be improved and the dispersibility of the inorganic filler 200 can be improved.

Examples of the modified polyolefin in which a polar group is grafted onto polyolefin include maleic anhydride-modified polyethylene, and the like.

Examples of copolymer of olefin and polar monomer include ethylene-ethyl acrylate copolymer, ethylene-methyl acrylate copolymer, ethylene-butyl acrylate copolymer, ethylene-methyl methacrylate copolymer, ethylene-glycidyl methacrylate copolymer, and the like. Two or more of them may be used in combination.

(Inorganic Filler)

The inorganic filler 200 acts to trap the space charges in the insulation layer 130 and to suppress the local accumulation of the space charge in the insulation layer 130. Thereby, the DC characteristics of the insulation layer 130 can be improved. The term "DC characteristics of the insulation layer 130" used herein means a volume resistivity, a DC breakdown electric field strength, space charge characteristics, and the like of the insulation layer 130.

Now, the inorganic filler 200 included in the resin composition of this embodiment will be explained with reference to FIG. 1. FIG. 1 is a sectional view illustrating the inorganic filler according to this embodiment.

The inorganic filler 200 of this embodiment is a particulate material, for example, formed by baking $Mg(OH)_2$ as a raw material, and containing at least MgO. $Mg(OH)_2$ as a raw material may be, for example, obtained from seawater resource (a raw material derived from seawater) or generated by underwater spark discharge method. Among them, a method for forming the inorganic filler by baking $Mg(OH)_2$ derived from seawater resource as a raw material is sometimes referred to as a "seawater method". This formation method will be described later.

As illustrated in FIG. 1, the inorganic filler 200 of this embodiment includes, for example, a core part 210 and a covering part 230.

The core part 210, for example, forms a center part of the inorganic filler 200, and contains $Mg(OH)_2$ as a main component. Specifically, the core part 210 is formed, for example, as (a) particle(s), in other words, includes $Mg(OH)_2$ particle(s) 220. The core part 210 may include a single $Mg(OH)_2$ particle 220 or a plurality of aggregated $Mg(OH)_2$ particles 220. The $Mg(OH)_2$ particle 220 may contain, for example, MgO or unavoidable impurities as long as it contains $Mg(OH)_2$ as a main component.

The covering part 230 contains, for example, a plurality of MgO particles 240 provided so as to cover an outer periphery of the core part 210. Specifically, each of the plurality of MgO particles 240 contains MgO as a main component, for example. Each of the plurality of MgO particles 240 is formed, for example, as a fine particle and is smaller than the core part 210. For example, a plurality of fine MgO particles 240 are aggregated and adhered onto an outer periphery of the core part 210 to form the covering part 230. Thereby, fine irregularities corresponding to external shapes of the plurality of MgO particles can be formed on the surface of the covering part 230. As a result, it is possible to delay the conversion from MgO into $Mg(OH)_2$ due to water that permeates into the insulation layer 130 when the DC power cable 10 is immersed in water for a long period of time. The resistance of the insulation layer 130 when the DC power cable 10 is immersed in water for a long period of time may be hereinafter referred to as "long-term water resistance of the insulation layer 130" in some cases.

In this embodiment, the covering part 230 is provided so as to cover an entire outer periphery of the core part 210, for example. In other words, the core part 210 containing $Mg(OH)_2$ is hidden inside the covering part 230 and is not exposed on the surface of the inorganic filler 200. Accordingly, the ability of the inorganic filler 200 to trap the space charges can be sufficiently secured.

Each MgO particle 240 may contain, for example, $Mg(OH)_2$ or unavoidable impurities as long as it contains MgO as a main component.

It can be confirmed by the following measurement that the inorganic filler 200 of this embodiment includes the core part 210 and the covering part 230 as described above.

Figure 3:
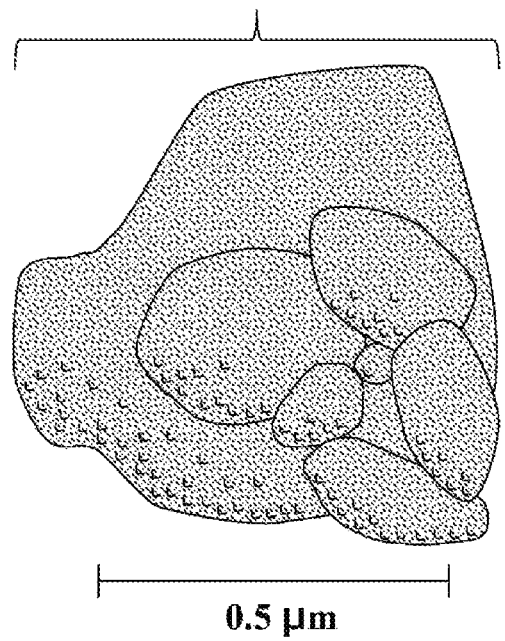
FIG. 3 is a schematic diagram of a scanning electron microscope image of the inorganic filler A.

FIG. 3 is a schematic view of a scanning electron microscope (SEM) image indicating the inorganic filler A in Examples described later. As illustrated in FIG. 3, the particle shape and surface state of the inorganic filler 200 can be confirmed by observation of the SEM image of the inorganic filler 200. Specifically, it can be confirmed that a plurality of fine particles are aggregated and adhered to the surface side of each particle of the inorganic filler 200. The fact that the fine particles correspond to MgO particles 240 can be confirmed, for example, by the following measurement.

The composition of the surface side of the inorganic filler 200 can be analyzed by the X-ray photoelectron spectroscopy (XPS) method. Specifically, in the XPS method, the inorganic filler 200 is irradiated with X-rays, and the energy spectrum of the thus generated photoelectron is measured.

Figure 4A:
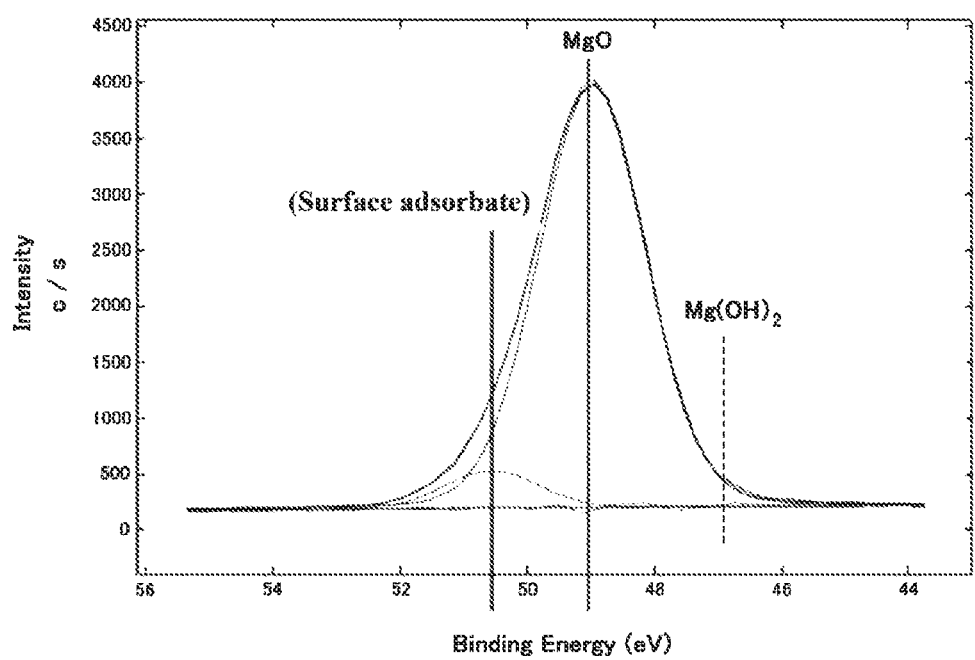
FIG. 4A is a diagram illustrating energy spectra of photoelectrons emitted from a surface side of an inorganic filler when the inorganic filler is measured by X-ray photoelectron spectroscopy method.

FIG. 4A is a diagram illustrating energy spectra of photoelectrons emitted from a surface side of the inorganic filler when the inorganic filler is measured by X-ray photoelectron spectroscopy method. As illustrated in FIG. 4A, when a narrow scan spectrum of the Mg 2p orbital of around 50 eV is measured, a peak derived from MgO (around 49 eV) appears, whereas a peak derived from $Mg(OH)_2$ (around 47 eV) does not appear. This confirms that, in a surface layer of the inorganic filler 200, no $Mg(OH)_2$ but only MgO is present in a region from which photoelectrons are emitted to the outside, the region being located at a depth of 0 nm or more and 3 nm or less from the surface. The inventors performed XPS measurements of MgO powder whose surface was forcibly converted into $Mg(OH)_2$, and, as a result, confirmed that a peak derived from $Mg(OH)_2$ was present around 47 eV.

Further, information on the functional groups in the inorganic filler 200 can be obtained by the Fourier transform infrared spectroscopy (FTIR) method. Specifically, the inorganic filler 200 is irradiated with the infrared rays by the penetration method of the FTIR method, and the infrared spectra of the inorganic filler 200 are measured based on the infrared rays penetrating the inorganic filler 200.

Figure 4B:
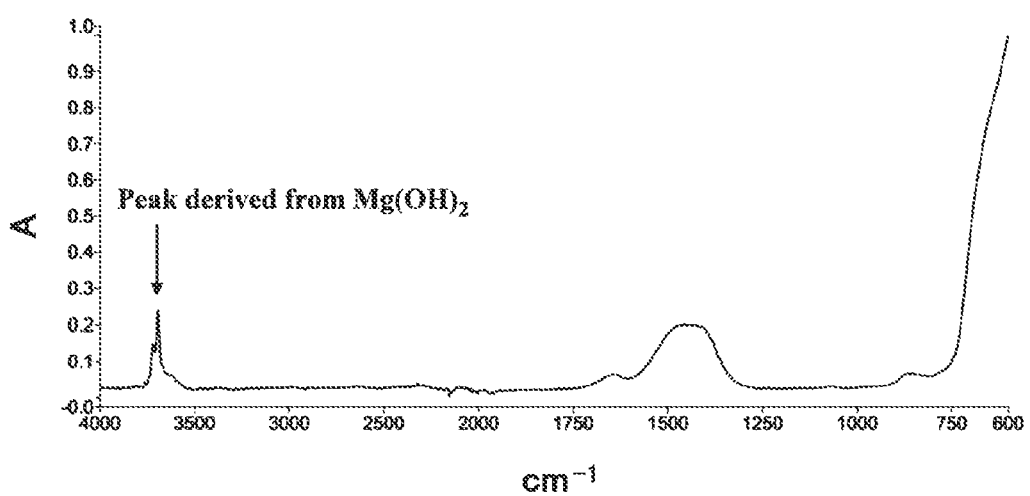
FIG. 4B is a diagram illustrating the infrared absorption spectrum of the inorganic filler measured by Fourier transform infrared spectroscopy method.

FIG. 4B is a diagram illustrating the infrared absorption spectrum of the inorganic filler measured by Fourier transform infrared spectroscopy method. As shown in FIG. 4B, a peak derived from $Mg(OH)_2$ (a peak derived from OH group) appears around 3700 $cm^{-1}$. This confirms the presence of $Mg(OH)_2$ in at least a part of the inner side of the inorganic filler 200.

From the above, it can be confirmed that the inorganic filler 200 includes, as described above, a core part 210 containing $Mg(OH)_2$ and a covering part 230 containing a plurality of MgO particles 240 provided so as to cover the outer periphery of the core part 210.

In this embodiment, a volume fraction of $Mg(OH)_2$ in one particle of the inorganic filler 200 (hereinafter sometimes abbreviated as "volume fraction of $Mg(OH)_2$") is, for example, 10% or more and less than 50%. The term "volume fraction of $Mg(OH)_2$ in one particle of the inorganic filler 200" used herein refers to a ratio of a volume occupied by $Mg(OH)_2$ in the one particle of the inorganic filler 200 with respect to a volume of the one particle of the inorganic filler 200.

The volume fraction of $Mg(OH)_2$ in the one particle of the inorganic filler 200 can be determined, for example, based on an ignition loss of the inorganic filler 200. The term "ignition loss of the inorganic filler 200" used herein refers to a decrease ratio in the mass of the inorganic filler 200 when the inorganic filler 200 is heated so that $Mg(OH)_2$ contained in the inorganic filler 200 is converted into MgO according to the following reaction formula:

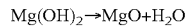

$$Mg(OH)_2 \rightarrow MgO + H_2O$$

When the volume fraction of $Mg(OH)_2$ in one particle of the inorganic filler 200 is determined based on the ignition loss of the above-described inorganic filler 200, the average volume fraction of $Mg(OH)_2$ in a plurality of particles of the inorganic filler 200 is obtained. In other words, the obtained volume fraction of $Mg(OH)_2$ corresponds to a ratio of the average volume of $Mg(OH)_2$ with respect to an average volume of the one particle of the inorganic filler 200.

When the volume fraction of $Mg(OH)_2$ is less than 10%, sufficient irregularities cannot be formed on the surface of the inorganic filler 200, and the surface of the inorganic filler 200 becomes nearly smooth. Therefore, there is a possibility that the ability of the inorganic filler 200 to trap the space charges cannot be sufficiently obtained. Moreover, there is a possibility that the long-term water resistance of the insulation layer 130 cannot be exhibited. In contrast, when the volume fraction of $Mg(OH)_2$ is 10% or more, fine irregularities can be formed on the surface of the inorganic filler 200. As a result, the ability of the inorganic filler 200 to trap the space charges can be sufficiently obtained. In addition, the long-term water resistance of the insulation layer 130 can be improved.

On the other hand, when the volume fraction of $Mg(OH)_2$ is 50% or more, the proportion of MgO on the surface layer side of the inorganic filler 200 decreases. Therefore, there is a possibility that the DC breakdown electric field strength of the insulation layer 130 decreases at the beginning (before immersion in water). The details of this causal relation are unknown, but the following mechanism is assumed. When the volume fraction of $Mg(OH)_2$ is 50% or more, the $Mg(OH)_2$ part in the core part 210 is easily disintegrated, so that particles of the inorganic filler 200 are easily disintegrated. When the particles of the inorganic filler 200 are disintegrated, the disintegrated particles result in poor dispersion, and spots in which the disintegrated particles are locally aggregated are formed in the insulation layer 130. When the disintegrated particles are locally aggregated, the local aggregation spots of the disintegrated particles behave as abnormal points (foreign matters) when the insulation layer 130 is observed as a whole. As a result, there is a possibility that the DC breakdown electric field strength of the insulation layer 130 decreases from the beginning. In contrast, when the volume fraction of Mg(OH)$_2$ is less than 50%, the proportion of MgO on the surface layer side of the inorganic filler 200 can be a predetermined value or more. Thereby, the disintegration of the inorganic filler 200 can be suppressed, and the local aggregation of the disintegrated particles can be suppressed. As a result, decrease in the DC breakdown electric field strength of the insulation layer 130 can be suppressed from the beginning.

In this embodiment, the content of the inorganic filler 200 in the resin composition is 0.1 parts by mass or more and 5 parts by mass or less with respect to 100 parts by mass of the base resin.

When the content of the inorganic filler 200 is less than 0.1 parts by mass, the space charges that are not trapped by the inorganic filler 200 increase. Therefore, there is a possibility that the volume resistivity of the insulation layer 130 decreases. In addition, when the DC power cable 10 is immersed in water for a long period of time, the water content affecting each particle of the inorganic filler 200 excessively increases. Therefore, there is a possibility that the long-term water resistance of the insulation layer 130 decreases. In contrast, when the content of the inorganic filler 200 is 0.1 parts by mass or more, the space charges that are not trapped by the inorganic filler 200 can be suppressed from increasing. Thereby, the volume resistivity of the insulation layer 130 can be suppressed from decreasing. In addition, when the DC power cable 10 is immersed in water for a long period of time, the excessive increase in the water content affecting each particle of the inorganic filler 200 can be suppressed. Thereby, the long-term water resistance of the insulation layer 130 can be improved.

On the other hand, when the content of the inorganic filler 200 is more than 5 parts by mass, the moldability of the resin composition is reduced, so that the dispersibility of the inorganic filler 200 in the insulation layer 130 decreases. Therefore, there is a possibility that a region including a relatively small amount of the inorganic filler 200 occurs in the insulation layer 130. As a result, there is a possibility that the DC breakdown electric field strength of the insulation layer 130 decreases and/or the long-term water resistance of the insulation layer 130 decreases. In contrast, when the content of the inorganic filler 200 is 5 parts by mass or less, the moldability of the resin composition can be improved, and the dispersibility of the inorganic filler 200 in the insulation layer 130 can be improved. Thereby, the region including a relatively small amount of the inorganic filler 200 can be suppressed from occurring in the insulation layer 130. As a result, the DC breakdown electric field strength of the insulation layer 130 can be suppressed from decreasing, and the long-term water resistance of the insulation layer 130 can be suppressed from decreasing.

In this embodiment, the mean volume diameter (MV) of the inorganic filler 200 is not particularly limited, but is, for example, 5 μm or less, and preferably 1 μm or less.

The term, "mean volume diameter (MV)" used herein is determined by the following formula:

$$MV = \Sigma(V_i d_i)/\Sigma V_i$$

wherein $d_i$ is a particle diameter and $V_i$ is a particle volume.

For a measurement of the mean volume diameter, a dynamic light scattering-type particle diameter/particle size distribution measuring device may be used.

When the mean volume diameter of the inorganic filler 200 is more than 5 μm, it may be difficult to uniformly disperse the inorganic filler 200 in the insulation layer 130. Therefore, it may be difficult to obtain the effect of improving the DC characteristics by the inorganic filler 200. In contrast, when the mean volume diameter of the inorganic filler 200 is 5 μm or less, the inorganic filler 200 can be uniformly dispersed in the insulation layer 130. Thereby, the effect of improving the DC characteristics by the inorganic filler 200 can be stably obtained. Furthermore, when the mean volume diameter of the inorganic filler 200 is 1 μm or less, it becomes easier to uniformly disperse the inorganic filler 200 in the insulation layer 130. Thereby, the improving effect of the DC characteristics by the inorganic filler 200 can be more stably obtained.

The lower limit of the mean volume diameter of the inorganic filler 200 is also not particularly limited. However, from the viewpoint of stably forming the inorganic filler 200 by baking Mg(OH)$_2$ as a raw material, the mean volume diameter of the inorganic filler 200 is, for example, 0.1 μm or more, and preferably 0.5 μm or more.

In this embodiment, the particle diameter of MgO particle 240 contained in the covering part 230 depends on, for example, the volume fraction of Mg(OH)$_2$ described above. When the baked state of the inorganic filler 200 is close to the completely baked state and the volume fraction of Mg(OH)$_2$ becomes smaller, the particle diameter of the MgO particle 240 becomes larger. On the other hand, when the inorganic filler 200 is in an incompletely baked state and the volume fraction of Mg(OH)$_2$ becomes larger, the particle diameter of MgO particle 240 becomes smaller. Specifically, when the volume fraction of Mg(OH)$_2$ is 29.2%, the particle diameter of MgO particle 240 is, for example, about 0.01 μm. The particle diameter of MgO particle 240 used herein means an average value of the particle diameters of MgO particles 240 measured in the SEM image.

In addition, at least a part of the inorganic filler 200 may be surface-treated with a silane coupling agent. Thereby, the adhesion of the interface between the inorganic filler 200 and the base resin can be improved, and the machine characteristics and low-temperature characteristics of the insulation layer 130 can be improved.

Examples of the silane coupling agent include vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, and the like. It should be noted that two or more of them may be used in combination.

(Crosslinking Agent)

A crosslinking agent is, for example, an organic peroxide. Examples of the organic peroxide include dicumylperoxide, 2,5-dimethyl-2,5-di(t-butylperoxy)hexane, 1,3-bis(t-butylperoxyisopropyl)benzene, and the like. Two or more of them may be used in combination.

(Other Additives)

The resin composition may further include, for example, an antioxidant and a lubricant.

Examples of the antioxidant include, for example, 2,2-thio-diethylene bis[3-(3,5-di-t-butyl-4-hydroxyphenyl)propionate], pentaerythrityl-tetrakis[3-(3,5-di-t-butyl-4-hydroxyphenyl)propionate], octadecyl 3-(3,5-di-t-butyl-4-hydroxyphenyl)propionate, 2,4-bis-[(octylthio)methyl]-o-cresol, 2,4-bis(n-octylthio)-6-(4-hydroxy-3,5-di-t-butylanilino)-1,3,5-triazine, bis[2-methyl-4-{3-n-alkyl(C12 or C14)thiopropionyloxy}-5-t-butylphenyl]sulfide, 4,4'-thiobis(3-methyl-6-t-butylphenol), and the like. Two or more of them may be used in combination.

The lubricant acts to suppress aggregation of the inorganic filler and also improve the fluidity of the resin composition during extrusion-molding of the insulation layer 130. The lubricant of this embodiment is, for example, a fatty acid metal salt, or a fatty acid amide. Examples of the fatty acid metal salt include magnesium stearate, zinc stearate, aluminum stearate, magnesium montanate, and the like. Examples of the fatty acid amide include oleic acid amide, stearic acid amide, and the like. Two or more of them may be used in combination.

The resin composition may further include a colorant, for example.

(2) DC Power Cable

Figure 2:
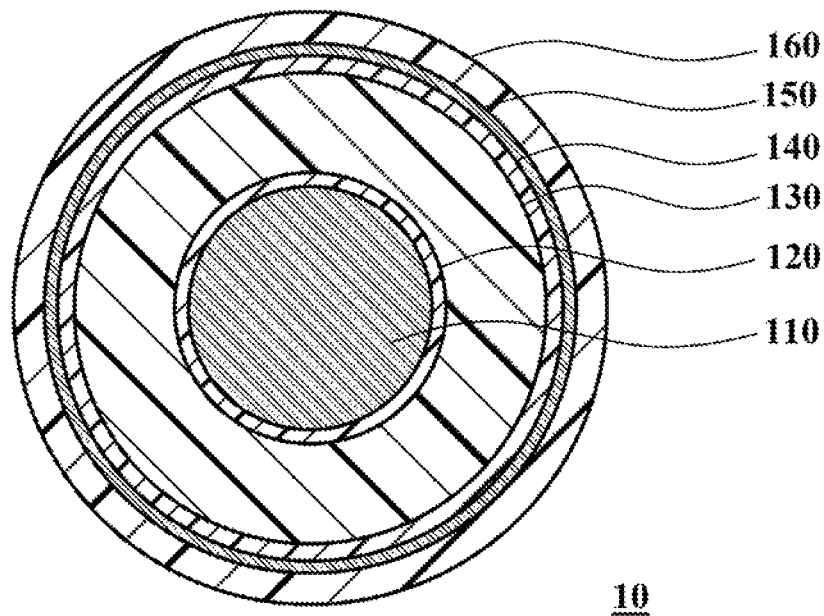
FIG. 2 is a schematic sectional view perpendicular to an axial direction of a DC power cable according to an embodiment of the present disclosure.

Next, with reference to FIG. 2, the DC power cable of this embodiment will be described. FIG. 2 is a cross-sectional view perpendicular to the axial direction of the DC power cable according to this embodiment.

The DC power cable 10 of this embodiment is configured as a so-called solid insulation DC power cable, and includes, for example, a conductor 110, an internal semiconductive layer 120, an insulation layer 130, an external semiconductive layer 140, a shielding layer 150, and a sheath 160.

(Conductor (Conductive Part))

The conductor 110 is configured by twisting together a plurality of conductor core wires (conductive core wires) including, for example, pure copper, copper alloy, aluminum, aluminum alloy, or the like.

(Internal Semiconductive Layer)

The internal semiconductive layer 120 is provided so as to cover the outer periphery of the conductor 110. In addition, the internal semiconductive layer 120 is configured to have semiconductivity and to suppress electric field concentration on the surface side of the conductor 110. The internal semiconductive layer 120 includes, for example, at least any one of ethylene-ethyl acrylate copolymer, ethylene-methyl acrylate copolymer, ethylene-butyl acrylate copolymer, and ethylene-vinyl acetate copolymer, together with conductive carbon black.

(Insulation Layer)

The insulation layer 130 is provided so as to cover the outer periphery of the internal semiconductive layer 120. The insulation layer 130 is crosslinked by heating the above-described resin composition of this embodiment after extrusion-molding. In other words, polyethylene as the base resin in the resin composition forming the insulation layer is crosslinked polyethylene. In addition, uncrosslinked polyethylene may be contained in the resin composition.

(External Semiconductive Layer)

The external semiconductive layer 140 is provided so as to cover the outer periphery of the insulation layer 130. In addition, the external semiconductive layer 140 is configured to have semiconductivity and to suppress electric field concentration between the insulation layer 130 and the shielding layer 150. The external semiconductive layer 140 contains, for example, the same material as that of the internal semiconductive layer 120.

(Shielding Layer)

The shielding layer 150 is provided so as to cover the outer periphery of the external semiconductive layer 140. The shielding layer 150 is, for example, configured by winding a copper tape, or configured as a wire shield formed by winding a plurality of soft copper wires. A tape including rubberized cloth or the like as a raw material may be wound inside or outside the shielding layer 150.

(Sheath)

The sheath 160 is provided so as to cover the outer periphery of the shielding layer 150. The sheath 160 contains, for example, polyvinyl chloride or polyethylene.

(Long-Term Water Resistance)

In the DC power cable 10 configured as described above, since the inorganic filler 200 added into the insulation layer 130 includes a core part 210 containing $Mg(OH)_2$ and a covering part 230 containing a plurality of MgO particles 240 provided so as to cover the outer periphery of the core part 210, for example, the following long-term water resistance of the insulation layer 130 is obtained.

The volume resistivity of a sheet of an insulation layer 130 is $1 \times 10^{15}$ Ω·cm or more, as measured under conditions at a temperature of 90° C. and a DC field of 80 kV/mm, when the sheet of the insulation layer 130 having a thickness of 0.15 mm is formed by immersing the DC power cable 10 in a water bath at a temperature of 40° C. for 30 days, and thereafter peeling the insulation layer 130 of the DC power cable 10.

Moreover, a dielectric breakdown electric field strength of a sheet of an insulation layer 130 is, for example, 250 kV/mm or more, as measured under condition at the temperature of 90° C., when the sheet of the insulation layer 130 is formed after the above-described immersion in water.

Moreover, a field enhancement factor FEF as obtained by the following formula (1) is less than 1.15, when the sheet of the insulation layer 130 is formed after the above-described immersion in water, and a DC field of 50 kV/mm is applied to the sheet of the insulation layer 130 under conditions at a temperature of 30° C. and an atmospheric pressure:

$$FEF = E_1/(V_0/T) \qquad (1)$$

(wherein $V_0$ represents a voltage (kV) applied to the sheet of the insulation layer 130, T represents a thickness (mm) of the sheet of the insulation layer 130, and $E_1$ represents a maximum electric field (kV/mm) in the sheet of the insulation layer 130).

(Specific Dimensions and the Like)

Specific dimensions of the DC power cable 10 are not particularly limited. For example, the diameter of the conductor 110 is 5 mm or more and 60 mm or less, the thickness of the internal semiconductive layer 120 is 1 mm or more and 3 mm or less, the thickness of the insulation layer 130 is 1 mm or more and 35 mm or less, the thickness of the external semiconductive layer 140 is 1 mm or more and 3 mm or less, the thickness of the shielding layer 150 is 1 mm or more and 5 mm or less, and the thickness of the sheath 160 is 1 mm or more. The DC voltage applied to the DC power cable 10 of this embodiment is, for example, 80 kV or more and 600 kV or less.

(3) Method for Producing DC Power Cable

Next, a method for producing the DC power cable of this embodiment will be described. Hereinafter, the step is abbreviated as "S".

(S100: Resin Composition Preparation Step)

First, a resin composition including a base resin containing polyolefin, and an inorganic filler is prepared. The resin composition preparation step S100 includes, for example, an inorganic filler preparation step S120 and a mixing step S140.

(S120: Inorganic Filler Preparation Step)

For example, an inorganic filler 200 is formed by a seawater method.

Specifically, for example, a magnesium raw material such as an aqueous solution of magnesium salt extracted from seawater and an alkali such as calcium hydroxide are subjected to a solution reaction to produce a slurry of $Mg(OH)_2$ as a precursor. After $Mg(OH)_2$ slurry is produced, the $Mg(OH)_2$ slurry is filtered and washed with water to produce a wet cake of $Mg(OH)_2$. After the wet cake of $Mg(OH)_2$ is produced, the wet cake of $Mg(OH)_2$ is dried and baked at a predetermined temperature. Thereby, fine powders of the inorganic filler 200 are produced.

When the above-described $Mg(OH)_2$ wet cake is baked at a predetermined temperature, the $Mg(OH)_2$ particles forming the $Mg(OH)_2$ wet cake gradually undergo a dehydration reaction from the periphery of the particles and are converted into MgO. At this time, the entire $Mg(OH)_2$ particles are not completely converted into MgO, but the baking is stopped in the middle of the conversion. Thereby, $Mg(OH)_2$ can be left on at least a part of the center side of $Mg(OH)_2$ particles while converting only the outer peripheral side of the $Mg(OH)_2$ particles into MgO. As a result, the inorganic filler 200 can be formed, which includes a core part 210 containing $Mg(OH)_2$ and a covering part 230 containing a plurality of MgO particles 240 provided so as to cover the outer periphery of the core part 210.

In this case, since the baking conditions (baking temperature, baking time, and the like) are adjusted, a volume fraction of $Mg(OH)_2$ in one particle of the inorganic filler 200 is 10% or more and less than 50%.

After the inorganic filler 200 is produced, at least a part of the inorganic filler 200 may be surface-treated with a silane coupling agent.

Further, the mean volume diameter of the inorganic filler 200 may be adjusted by performing a predetermined pulverization treatment. At this time, the mean volume diameter of the inorganic filler 200 is, for example, 5 μm or less, preferably 1 μm or less.

(S140: Mixing Step)

The base resin containing polyethylene, the inorganic filler 200, a crosslinking agent containing an organic peroxide, and other additives (an antioxidant, a lubricant, etc.) are mixed (kneaded) by a mixer such as a Banbury mixer or a kneader, to form a mixed material. After the mixed material is formed, the mixed material is granulated by an extruder. As a result, a pellet-like resin composition that will form the insulation layer 130 is formed. The steps from the mixing step through the granulation step may be collectively performed using a twin-screw type extruder with high kneading performance.

(S200: Conductor Preparation Step)

Meanwhile, a conductor 110 is prepared which is formed by twisting a plurality of conductor core wires.

(S300: Cable Core Formation Step (Extrusion Step))

Next, a resin composition for the internal semiconductive layer in which ethylene-ethyl acrylate copolymer and electrically conductive carbon black are mixed in advance is charged into an extruder A of a three-layer coextruder, the extruder A forming the internal semiconductive layer 120.

The pellet-like resin composition described above is charged into an extruder B forming the insulation layer 130.

A resin composition for the external semiconductive layer is charged into an extruder C forming the external semiconductive layer 140, and the composition including materials similar to those of the resin composition for the internal semiconductive layer is charged into the extruder A.

Then, the respective extrudates from the extruders A to C are guided to a common head, and the internal semiconductive layer 120, the insulation layer 130, and the external semiconductive layer 140, outwardly from the inside, are simultaneously extruded on the outer periphery of the conductor 110. Thereafter, the insulation layer 130 is crosslinked by heating with radiation from an infrared heater or heat-transferring through a heat medium such as high-temperature nitrogen gas or silicone oil, in a crosslinking tube pressurized with nitrogen gas or the like. Thereby, the cable core including the conductor 110, the internal semiconductive layer 120, the insulation layer 130, and the external semiconductive layer 140 is formed.

(S400: Shielding Layer Formation Step)

Next, the shielding layer 150 is formed on the outside of the external semiconductive layer 140, for example, by winding a copper tape therearound.

(S500: Sheath Formation Step)

Then, vinyl chloride is charged into an extruder and extruded from the extruder, to form a sheath 160 on the outer periphery of the shielding layer 150.

As described above, the DC power cable 10 as the solid insulation DC power cable is produced.

(4) Effect According to this Embodiment

According to this embodiment, one or more effects described below are achieved.

(a) The inorganic filler 200 to be added to the insulation layer 130 includes a core part 210 containing $Mg(OH)_2$, and a covering part 230 containing a plurality of MgO particles 240 provided so as to cover an outer periphery of the core part 210. Thereby, fine irregularities corresponding to external shapes of the plurality of MgO particles 240 can be formed on the surface of the covering part 230. Since fine irregularities are formed on the surface of the covering part 230, the conversion from MgO into $Mg(OH)_2$, due to water that permeates into the insulation layer 130 when the DC power cable 10 is immersed in water for a long period of time, can be generated only at a part of the surface of the inorganic filler 200, and a period required for converting the entire surface of the inorganic filler 200 into $Mg(OH)_2$ can be elongated. In other words, a part containing MgO can be left on the surface of the inorganic filler 200 for a long period of time.

Since a part containing MgO is left on the surface of the inorganic filler 200, the ability of the inorganic filler 200 to trap the space charges can be maintained, even when the DC power cable 10 is immersed in water for a long period of time. Thereby, the local accumulation of space charges in the insulation layer 130 can be suppressed. As a result, it is possible to suppress a degradation in the DC characteristics of the insulation layer 130 due to long-term immersion in water.

(b) The volume fraction of $Mg(OH)_2$ in one particle of the inorganic filler 200 is 10% or more and less than 50%. Since the volume fraction of $Mg(OH)_2$ is 10% or more, fine irregularities can be formed on the surface of the inorganic filler 200. Thereby, the ability of the inorganic filler 200 to trap the space charges can be sufficiently obtained. In addition, the long-term water resistance of the insulation layer 130 can be improved. Moreover, when the volume fraction of $Mg(OH)_2$ is less than 50%, the proportion of MgO on the surface layer side of the inorganic filler 200 can be a predetermined value or more. Thereby, decrease in the DC breakdown electric field strength of the insulation layer 130 can be suppressed from the beginning.

(c) The content of the inorganic filler 200 in the resin composition is 0.1 parts by mass or more and 5 parts by mass or less with respect to 100 parts by mass of the base resin. When the content of the inorganic filler 200 is 0.1 parts by mass or more, the space charges that are not trapped by the inorganic filler 200 can be suppressed from increasing. Thereby, the volume resistivity of the insulation layer 130 can be suppressed from decreasing. In addition, when the DC power cable 10 is immersed in water for a long period of time, the excessive increase in the water content affecting each particle of the inorganic filler 200 can be suppressed. Thereby, the long-term water resistance of the insulation layer 130 can be improved. Moreover, when the content of the inorganic filler 200 is 5 parts by mass or less, the moldability of the resin composition can be improved, and the dispersibility of the inorganic filler 200 in the insulation layer 130 can be improved. Thereby, the region including a relatively small amount of the inorganic filler 200 can be suppressed from occurring in the insulation layer 130. As a result, the DC breakdown electric field strength of the insulation layer 130 can be suppressed from decreasing, and the long-term water resistance of the insulation layer 130 can be suppressed from decreasing.

(d) The covering part 230 is provided so as to cover the entire outer periphery of the core part 210. In other words, the core part 210 containing $Mg(OH)_2$ is hidden inside the covering part 230 and is not exposed on the surface of the inorganic filler 200. As described above, the ability of $Mg(OH)_2$ to trap the space charges is lower than that of MgO. Accordingly, when the core part 210 containing $Mg(OH)_2$ is prevented from being exposed on the surface of the inorganic filler 200 as in this embodiment, the ability of the inorganic filler 200 to trap the space charges can be sufficiently secured.

(e) Because of the high adhesion of MgO to $Mg(OH)_2$, the plurality of MgO particles 240 forming the covering part 230 can be firmly adhered to the core part 210. Thereby, even when the resin composition including the inorganic filler 200 is mixed or the insulation layer 130 is extrusion-molded using the resin composition, the MgO particles 240 can be prevented from being dispersed from the core part 210. When the dispersion of the MgO particles 240 from the core part 210 is suppressed, fine irregularities formed to correspond to external shapes of the plurality of MgO particles 240 can be maintained on the surface of the covering part 230, and the core part 210 containing $Mg(OH)_2$ can be suppressed from being exposed. As a result, the ability of the inorganic filler 200 to trap the space charges can be sufficiently secured, even after undergoing various steps.

(f) The inorganic filler 200 is formed by baking $Mg(OH)_2$ as a raw material. Thereby, the inorganic filler 200 including the core part 210 and the covering part 230 can be easily formed. Further, the inorganic filler 200 can be formed at a lower cost as compared with the "vapor phase method".

As a method for forming the inorganic filler by the "vapor phase method", metal Mg is firstly heated to generate Mg vapor. After Mg vapor is generated, the Mg vapor and the oxygen-containing gas are brought into contact with each other to oxidize the Mg vapor. Thereby, fine powders of the inorganic filler containing MgO are generated. The vapor phase method produces high-purity MgO, but is expensive. $Mg(OH)_2$ is not contained in the inorganic filler formed by the vapor phase method.

Other Embodiments According to the Disclosure

Although embodiments of the present disclosure have been specifically described, the present disclosure is not limited to the embodiments described above, and various modifications can be made without departing from the scope of the present disclosure.

In the above embodiments, the resin composition is described as having the inorganic filler 200 formed by baking $Mg(OH)_2$ as a raw material, but the resin composition may further include the inorganic filler containing MgO formed by the vapor phase method.

In the above embodiments, the resin composition is described as having the inorganic filler 200 containing MgO, but the resin composition may further include the inorganic filler containing carbon black.

In the above-described embodiments, the inorganic filler 200 is described as being surface-treated with a silane coupling agent, but the inorganic filler 200 may not be surface-treated with a silane coupling agent. Alternatively, the inorganic filler 200 may be a mixture of powders surface-treated with a silane coupling agent and powders not surface-treated.

EXAMPLES

Next, examples according to the present disclosure will be described. These examples are illustrative of the present disclosure, and the present disclosure is not limited by these examples.

(1) DC Power Cable Sample (1-1) Preparation (Production) of Resin Composition

The following compounded agents were mixed by a Banbury mixer and granulated by an extruder to produce a pellet-like resin composition. Here, nine resin compositions with different inorganic fillers were produced.

(Base Resin)

Low-density polyethylene (LDPE) (Density d=0.920, MFR=1 g/10 min) 100 parts by mass (Inorganic Filler)

Any one of the following inorganic fillers A to F was used.

Inorganic filler A: mean volume diameter, 0.5 μm; volume fraction of $Mg(OH)_2$, 29.2%;

Inorganic filler B: mean volume diameter, 3.5 μm; volume fraction of $Mg(OH)_2$, 29.2%;

Inorganic filler C: mean volume diameter, 3.5 μm; volume fraction of $Mg(OH)_2$, 12.0%;

Inorganic filler D: mean volume diameter, 3.5 μm; volume fraction of $Mg(OH)_2$, 52.9%;

Inorganic filler E: mean volume diameter, 3.5 μm; volume fraction of $Mg(OH)_2$, 7.3%.

(Crosslinking Agent)

2,5-Dimethyl-2,5-di(t-butylperoxy)hexane 1.3 parts by mass (Other Additives)

Lubricant: Oleic acid amide predetermined amount

Antioxidant: 4,4'-Thiobis(3-methyl-6-t-butylphenol) predetermined amount (1-2) Production of DC Power Cable Sample Next, a conductor is prepared which is formed by twisting a plurality of conductor core wires made of dilute copper alloy with a diameter of 14 mm. After the conductor was prepared, a resin composition for an internal semiconductive layer including ethylene-ethyl acrylate copolymer, a resin composition for an insulation layer prepared in (1-1) described above, and a resin composition for an external semiconductive layer including a similar material to the resin composition for the internal semiconductive layer were respectively charged into extruders A to C. The respective extrudates from the extruders A to C were guided to a common head, and the internal semiconductive layer, the insulation layer, and the external semiconductive layer, outwardly from the inside, were simultaneously extruded on the outer periphery of the conductor. At this time, the thicknesses of the internal semiconductive layer, the insulation layer and the external semiconductive layer were 1 mm, 14 mm, and 1 mm, respectively. After that, the above-described extrusion-molded product was heated at about 250° C. to crosslink the resin composition for the insulation layer. As a result, a sample of the DC power cable including the conductor, the internal semiconductive layer, the insulation layer, and the external semiconductive layer, outwardly from the center, was produced.

Through the above process, the DC power cable samples 1 to 9 were produced respectively using each of 9 resin compositions including different inorganic fillers.

(2) Evaluation of DC Power Cable Sample

On each of the DC power cable samples 1 to 9, the following initial evaluation and the evaluation after long-term immersion in water were performed.

(2-1) Initial Evaluation (Sample Processing)

By peeling each of the DC power cable samples 1 to 9 from the outer peripheral surface, the sheet of the insulation layer having a thickness of 0.15 mm was formed.

(Volume Resistivity)

The sheet of the insulation layer described above was immersed in silicone oil at a temperature of 90° C., and a DC field of 80 kV/mm was applied to the sheet of the insulation layer using a plate electrode with a diameter of 25 mm to measure the volume resistivity. The volume resistivity of $1 \times 10^{15}$ Ω·cm or more was evaluated as good.

(DC Breakdown Electric Field Strength)

The sheet of the insulation layer described above was immersed in silicone oil at a temperature of 90° C., and the applied voltage was raised at a rate of 4 kV/min using a plate electrode with a diameter of 25 mm. When the insulation layer sheet reached dielectric breakdown, the voltage applied at that time was divided by the sheet thickness to obtain the DC breakdown electric field strength of the insulation layer sheet. The DC breakdown electric field strength of 250 kV/mm or more was evaluated as good.

(Space Charge Characteristics)

The space charge characteristics of the sheet of the insulation layer were evaluated using a space charge measuring device (manufactured by Five Lab Co., Ltd.) according to the pulsed electro-acoustic method (PEA method). Specifically, under conditions at a temperature of 30° C. and an atmospheric pressure, a DC field of 50 kV/mm was continuously applied to the sheet of the insulation layer over 1 hour, and the maximum electric field inside the sheet was measured. At this time, the field enhancement factor FEF was obtained by the above formula (1). The field enhancement factor FEF of less than 1.15 was evaluated as A (good) and the FEF of 1.15 or more was evaluated as B (poor).

(2-2) Evaluation after Long-Term Immersion (Immersion-in-Water Test and Sample Processing)

Each of the DC power cable samples 1 to 9 was cut into a length of 500 mm, and the end of the cut cable was closed (sealed) with silicone rubber so that water did not permeate from the end. Then, the cut cable was immersed in a water bath at a temperature of 40° C. for 30 days. The end of the cut cable was not immersed. After immersion, the central portion of the cut cable was peeled from the outer peripheral surface to form a sheet of the insulation layer having a thickness of 0.15 mm.

(Volume Resistivity, DC Breakdown Electric Field Strength, Space Charge Characteristics)

The sheet of the insulation layer after immersion described above was evaluated for volume resistivity, DC breakdown electric field strength, and space charge characteristics in the same manner as in the initial evaluation.

(3) Results

The results of the evaluation of the DC power cable samples are illustrated in Table 1 below. In Table 1, the content of the compounded agent is expressed in "parts by mass". Further, the mean volume diameter of the inorganic filler is described as "MV", and the volume fraction of $Mg(OH)_2$ in the inorganic filler is described as "$Mg(OH)_2$ VF". In addition, the result of the initial evaluation is described as "Initial", and the result of the evaluation after immersion in water is described as "After Immersion in Water".

TABLE 1

| | Sample | | | | | | | | |
|---|---|---|---|---|---|---|---|---|---|
| | 1 | 2 | 3 | 4 | 5 | 6 | 7 | 8 | 9 |
| LDPE | 100 | 100 | 100 | 100 | 100 | 100 | 100 | 100 | 100 |
| Inorganic Filler A (MV = 0.5 μm, $Mg(OH)_2$VF = 29.2%) | 1 | | | 0.1 | 5 | | | 0.05 | 7 |
| Inorganic filler B (MV = 3.5 μm, $Mg(OH)_2$VF = 29.2%) | | 1 | | | | | | | |
| Inorganic filler C (MV = 3.5 μm, $Mg(OH)_2$VF = 12.0%) | | | 1 | | | | | | |
| Inorganic filler D (MV = 3.5 μm, $Mg(OH)_2$VF = 52.9%) | | | | | | | 1 | | |
| Inorganic filler E (MV = 3.5 μm, $Mg(OH)_2$VF = 7.3%) | | | | | | 1 | | | |
| Initial: Volume Resistivity (Ω·cm) | $4 \times 10^{15}$ | $3 \times 10^{15}$ | $3 \times 10^{15}$ | $2 \times 10^{15}$ | $3 \times 10^{15}$ | $4 \times 10^{15}$ | $3 \times 10^{15}$ | $6 \times 10^{14}$ | $1 \times 10^{15}$ |
| Initial: DC Breakdown Electric field Strength (kV/mm) | 310 | 300 | 290 | 285 | 270 | 230 | 280 | 270 | 230 |
| Initial: Space Charge Characteristics (A~B) | A | A | A | A | A | A | B | A | A |
| After Immersion in Water: Volume Resistivity (Ω·cm) | $3 \times 10^{15}$ | $2 \times 10^{15}$ | $1 \times 10^{15}$ | $1 \times 10^{18}$ | $1 \times 10^{15}$ | $1 \times 10^{15}$ | $2 \times 10^{18}$ | $4 \times 10^{14}$ | $4 \times 10^{14}$ |

TABLE 1-continued

|  | Sample | | | | | | | | |
|---|---|---|---|---|---|---|---|---|---|
|  | 1 | 2 | 3 | 4 | 5 | 6 | 7 | 8 | 9 |
| After Immersion in Water: DC Breakdown Electric field Strength (kV/mm) | 290 | 270 | 265 | 250 | 250 | 200 | 220 | 230 | 195 |
| After Immersion in Water: Space Charge Characteristics (A~B) | A | A | A | A | A | A | B | B | A |

(Sample 6)

In sample 6 using the inorganic filler D in which the volume fraction of $Mg(OH)_2$ was 50% or more, the DC breakdown electric field strength was less than 250 kV/mm from the beginning. In sample 6, it is considered that the particles of the inorganic filler are disintegrated, so that local aggregation spots of the disintegrated particles are formed.

(Sample 7)

In sample 7 using the inorganic filler E in which the volume fraction of $Mg(OH)_2$ was less than 10%, the space charge characteristics were B from the beginning. In the sample 7, it is considered that since sufficient irregularities are not formed on the surface of the inorganic filler, the ability of the inorganic filler to trap space charges cannot be sufficiently obtained.

Further, in sample 7, the DC breakdown electric field strength after immersion in water was less than 250 kV/mm, and the space charge characteristics after immersion in water were B. In the sample 7, it is considered that since sufficient irregularities are not formed on the surface the inorganic filler as described above, the entire surface of the inorganic filler is rapidly converted into $Mg(OH)_2$. Therefore, it is considered that the long-term water resistance of the insulation layer cannot be obtained.

(Sample 8)

In sample 8 in which the content of the inorganic filler A was less than 0.1 parts by mass, the volume resistivity was less than $1\times10^{15}$ Ω·cm from the beginning. In the sample 8, it is considered that since the content of the inorganic filler is small, the space charges that are not trapped by the inorganic filler increase. Therefore, it is considered that the volume resistivity of the insulation layer decreases.

Further, in sample 8, all of the volume resistivity, the DC breakdown electric field strength, and the space charge characteristics after immersion in water were poor. In sample 8, it is considered that when the DC power cable is immersed in water for a long period of time, the water content affecting each particle of the inorganic filler excessively increases. Therefore, it is considered that the long-term water resistance of the insulation layer decreases.

(Sample 9)

In sample 9 in which the content of the inorganic filler A was more than 5 parts by mass, the DC breakdown electric field strength was less than 250 kV/mm from the beginning. Further, in sample 9, the volume resistivity and the DC breakdown electric field strength after immersion in water was poor.

In the sample 9, it is considered that since the content of the inorganic filler A is large, the moldability of the resin composition is reduced, so that the dispersibility of the inorganic filler in the insulation layer decreases. Therefore, it is considered that a region including a relatively small amount of the inorganic filler has occurred in the insulation layer. As a result, it is considered that the DC breakdown electric field strength of the insulation layer decreases and/or the long-term water resistance of the insulation layer decreases, from the beginning.

(Samples 1 to 5)

In samples 1 to 5 which use any one of the inorganic fillers A to C with a volume fraction of $Mg(OH)_2$ of 10% or more and less than 50% and have the content of the inorganic filler of 0.1 parts by mass or more and 5 parts by mass or less, all of the volume resistivity, DC breakdown electric field strength and space charge characteristics at the beginning were good, and all of the volume resistivity, DC breakdown electric field strength and space charge characteristics after immersion in water were good.

In the samples 1 to 5, when the volume fraction of $Mg(OH)_2$ is less than 50%, the proportion of MgO on the surface layer side of the inorganic filler can be a predetermined value or more. Thereby, the disintegration of the inorganic filler can be suppressed, and the local aggregation of the disintegrated particles can be suppressed. As a result, it is confirmed that, in samples 1 to 5, decrease in the DC breakdown electric field strength of the insulation layer can be suppressed from the beginning.

In the samples 1 to 5, when the volume fraction of $Mg(OH)_2$ was 10% or more, fine irregularities were formed on the surface of the inorganic filler (see FIG. 3). Thereby, in samples 1 to 5, it is confirmed that the ability of the inorganic filler to trap the space charges can be sufficiently obtained, and the space charge characteristics can be improved from the beginning.

In the samples 1 to 5, since the fine irregularities are formed on the surface of the inorganic filler, it is possible to delay the conversion of the entire surface of the inorganic filler into $Mg(OH)_2$ during long-term immersion in water so that a part containing MgO can be left on the surface of the inorganic filler. As a result, in samples 1 to 5, it is confirmed that a degradation in the DC characteristics of the insulation layer due to long-term immersion in water can be suppressed.

In the samples 1 to 5, when the content of the inorganic filler is 0.1 parts by mass or more, the space charges that are not trapped by the inorganic filler 200 can be suppressed from increasing. Thereby, in samples 1 to 5, it is confirmed that decrease in the volume resistivity of the insulation layer can be suppressed from the beginning.

In addition, in the samples 1 to 5, since the content of the inorganic filler is 0.1 parts by mass or more, the excessive increase in the water content affecting each particle of the inorganic filler can be suppressed when the DC power cable is immersed in water for a long period of time. Thereby, in samples 1 to 5, it is confirmed that the long-term water resistance of the insulation layer can be improved.

Moreover, in the samples 1 to 5, when the content of the inorganic filler is 5 parts by mass or less, the moldability of the resin composition can be improved, and the dispersibility of the inorganic filler in the insulation layer can be improved. Thereby, the region including a relatively small amount of the inorganic filler can be suppressed from occurring in the insulation layer. As a result, in samples 1 to 5, it is confirmed that the DC breakdown electric field strength of the insulation layer can be suppressed from decreasing, and the long-term water resistance of the insulation layer can be suppressed from decreasing.

<Preferred Aspect of the Disclosure>

Hereinafter, supplementary descriptions of the preferred aspects of the present disclosure will be given.

(Supplementary Description 1)

A resin composition, including:
a base resin containing polyolefin, and
an inorganic filler,
wherein
the inorganic filler includes:
 a core part containing $Mg(OH)_2$, and
 a covering part containing a plurality of MgO particles provided on an outer periphery of the core part;
the content of the inorganic filler in the resin composition is 0.1 parts by mass or more and 5 parts by mass or less with respect to 100 parts by mass of the base resin; and
a volume fraction of $Mg(OH)_2$ in one particle of the inorganic filler is 10% or more and less than 50%.

(Supplementary Description 2)

A resin composition, including:
a base resin containing polyolefin, and
an inorganic filler,
wherein
the inorganic filler includes:
 a core part containing $Mg(OH)_2$, and
 a covering part containing a plurality of MgO particles provided on an outer periphery of the core part; and
a volume resistivity of a sheet of the insulation layer is $1 \times 10^{15}$ Ω·cm or more, as measured under conditions at a temperature of 90° C. and a direct-current field of 80 kV/mm, when the sheet of the insulation layer having a thickness of 0.15 mm is formed by preparing a direct-current power cable having an insulation layer including the resin composition, and immersing the direct-current power cable in a water bath at a temperature of 40° C. for 30 days, and thereafter peeling the insulation layer of the direct-current power cable.

(Supplementary Description 3)

A resin composition, including:
a base resin containing polyolefin, and
an inorganic filler,
wherein
the inorganic filler includes:
 a core part containing $Mg(OH)_2$, and
 a covering part containing a plurality of MgO particles provided on an outer periphery of the core part; and
a dielectric breakdown electric field strength of a sheet of an insulation layer is 250 kV/mm or more, as measured under a condition at a temperature of 90° C., when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable.

(Supplementary Description 4)

A resin composition, including:
a base resin containing polyolefin, and
an inorganic filler,
wherein
the inorganic filler includes:
 a core part containing $Mg(OH)_2$, and
 a covering part containing a plurality of MgO particles provided on an outer periphery of the core part; and
a field enhancement factor FEF of a sheet of an insulation layer is less than 1.15, as obtained by the following formula (1), when the sheet of the insulation layer having a thickness of 0.15 mm is formed by preparing a direct-current power cable having the insulation layer including the resin composition, and immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure:

$$FEF = E_1/(V_0/T) \quad (1)$$

wherein $V_0$ represents a voltage (kV) applied to the sheet, T represents a thickness (mm) of the sheet, and $E_1$ represents a maximum electric field (kV/mm) in the sheet.

(Supplementary Description 5)

The resin composition according to any one of the supplementary descriptions 1 to 4,
wherein a surface of the covering part has irregularities corresponding to external shapes of the plurality of MgO particles.

(Supplementary Description 6)

The resin composition according to any one of the supplementary descriptions 1 to 5,
wherein the plurality of MgO particles in the covering part are aggregated and adhered to the outer periphery of the core part.

(Supplementary Description 7)

The resin composition according to any one of the supplementary descriptions 1 to 6,
wherein the covering part is provided on an entire outer periphery of the core part.

(Supplementary Description 8)

A resin composition, including:
a base resin containing polyolefin, and
an inorganic filler containing at least MgO,
wherein
the inorganic filler exhibits no peak derived from $Mg(OH)_2$ but a peak derived from MgO when energy spectra of photoelectrons emitted from a surface side of the inorganic filler are measured by X-ray photoelectron spectroscopy method,
whereas the inorganic filler exhibits a peak derived from $Mg(OH)_2$ when an infrared spectrum of the inorganic filler is measured by Fourier transform infrared spectroscopy method based on infrared rays penetrating the inorganic filler;
the content of the inorganic filler in the resin composition is 0.1 parts by mass or more and 5 parts by mass or less with respect to 100 parts by mass of the base resin; and
a volume fraction of $Mg(OH)_2$ in one particle of the inorganic filler is 10% or more and less than 50%.

(Supplementary Description 9)

The resin composition according to any one of the supplementary descriptions 1 to 8,
wherein the inorganic filler is inorganic powder obtained by baking $Mg(OH)_2$ as a raw material.

(Supplementary Description 10)

The resin composition according to any one of the supplementary descriptions 1 to 9, wherein a mean volume diameter of the inorganic filler is 5 μm or less.

(Supplementary Description 11)

An inorganic filler, including:
a core part containing $Mg(OH)_2$, and
a covering part containing a plurality of MgO particles provided on an outer periphery of the core part,
wherein a volume fraction of $Mg(OH)_2$ in one particle of the inorganic filler is 10% or more and less than 50%.

(Supplementary Description 12)

An inorganic filler
which exhibits no peak derived from $Mg(OH)_2$ but a peak derived from MgO when energy spectra of photoelectrons emitted from a surface side of the inorganic filler are measured by X-ray photoelectron spectroscopy method,
whereas the inorganic filler exhibits a peak derived from $Mg(OH)_2$ when an infrared spectrum of the inorganic filler is measured by Fourier transform infrared spectroscopy method based on infrared rays penetrating the inorganic filler,
wherein a volume fraction of $Mg(OH)_2$ in one particle of the inorganic filler is 10% or more and less than 50%.

(Supplementary Description 13)

A direct-current power cable, including:
a conductor, and
an insulation layer provided on an outer periphery of the conductor;
wherein
the insulation layer includes a resin composition including:
a base resin containing polyolefin, and
an inorganic filler;
the inorganic filler includes:
a core part containing $Mg(OH)_2$, and
a covering part containing a plurality of MgO particles provided on an outer periphery of the core part;
the content of the inorganic filler in the resin composition is 0.1 parts by mass or more and 5 parts by mass or less with respect to 100 parts by mass of the base resin; and
a volume fraction of $Mg(OH)_2$ in one particle of the inorganic filler is 10% or more and less than 50%.

(Supplementary Description 14)

A direct-current power cable, including:
a conductor, and
an insulation layer provided on an outer periphery of the conductor;
wherein
the insulation layer includes a resin composition including:
a base resin containing polyolefin, and
an inorganic filler;
the inorganic filler includes:
a core part containing $Mg(OH)_2$, and
a covering part containing a plurality of MgO particles provided on an outer periphery of the core part; and
a volume resistivity of a sheet of an insulation layer is $1\times10^{15}$ Ω·cm or more, as measured under conditions at a temperature of 90° C. and a direct-current field of 80 kV/mm, when the sheet of the insulation layer having a thickness of 0.15 mm is formed by immersing the direct-current power cable in a water bath at a temperature of 40° C. for 30 days, and thereafter peeling the insulation layer of the direct-current power cable.

(Supplementary Description 15)

A direct-current power cable, including:
a conductor, and
an insulation layer provided on an outer periphery of the conductor;
wherein
the insulation layer includes a resin composition including:
a base resin containing polyolefin, and
an inorganic filler;
the inorganic filler includes:
a core part containing $Mg(OH)_2$, and
a covering part containing a plurality of MgO particles provided on an outer periphery of the core part; and
a dielectric breakdown electric field strength of a sheet of an insulation layer is 250 kV/mm or more, as measured under a condition at a temperature of 90° C., when the sheet of the insulation layer having a thickness of 0.15 mm is formed by immersing the direct-current power cable in a water bath at a temperature of 40° C. for 30 days, and thereafter peeling the insulation layer of the direct-current power cable.

(Supplementary Description 16)

A direct-current power cable, including:
a conductor, and
an insulation layer provided on an outer periphery of the conductor;
wherein
the insulation layer includes a resin composition including:
a base resin containing polyolefin, and
an inorganic filler;
the inorganic filler includes:
a core part containing $Mg(OH)_2$, and
a covering part containing a plurality of MgO particles provided on an outer periphery of the core part; and
a field enhancement factor FEF of a sheet of an insulation layer is less than 1.15, as obtained by the following formula (1), when the sheet of the insulation layer having a thickness of 0.15 mm is formed by immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure:

$$\text{FEF} = E_1/(V_0/T) \qquad (1)$$

wherein $V_0$ represents a voltage (kV) applied to the sheet, T represents a thickness (mm) of the sheet, and $E_1$ represents a maximum electric field (kV/mm) in the sheet.

(Supplementary Description 17)

A direct-current power cable, including:
a conductor, and
an insulation layer provided on an outer periphery of the conductor;
wherein
the insulation layer includes a resin composition including:
a base resin containing polyolefin, and
an inorganic filler containing at least MgO;
the inorganic filler exhibits no peak derived from $Mg(OH)_2$ but a peak derived from MgO when energy spectra of photoelectrons emitted from a surface side of the inorganic filler are measured by X-ray photoelectron spectroscopy method, whereas the inorganic filler exhibits a peak derived from Mg(OH)$_2$ when an infrared spectrum of the inorganic filler is measured by Fourier transform infrared spectroscopy method based on infrared rays penetrating the inorganic filler; and a volume fraction of Mg(OH)$_2$ in one particle of the inorganic filler is 10% or more and less than 50%.

(Supplementary Description 18)

A method for producing a direct-current power cable, including:

preparing a resin composition including a base resin containing polyolefin, and an inorganic filler; and forming an insulation layer on an outer periphery of a conductor using the resin composition, wherein the preparation of the resin composition includes:

preparing the inorganic filler including a core part containing Mg(OH)$_2$, and a covering part containing a plurality of MgO particles provided on an outer periphery of the core part, and mixing the resin composition so that a content of the inorganic filler in the resin composition is 0.1 parts by mass or more and 5 parts by mass or less with respect to 100 parts by mass of the base resin; and in the preparation of the inorganic filler, a volume fraction of Mg(OH)$_2$ in one particle of the inorganic filler is 10% or more and less than 50%.

(Supplementary Description 19)

The method for producing a direct-current power cable according to the supplementary description 18, wherein the inorganic filler is formed by baking Mg(OH)$_2$ as a raw material.

DESCRIPTION OF SIGNS AND NUMERALS

10 Direct-current power cable
110 Conductor
120 Internal semiconductive layer
130 Insulation layer
140 External semiconductive layer
150 Shielding layer
160 Sheath
200 Inorganic filler
210 Core part
220 Mg(OH)$_2$ particle
230 Covering part
240 MgO particle

The invention claimed is:

1. A direct-current power cable, comprising:
a conductor, and
an insulation layer provided so as to cover an outer periphery of the conductor;
wherein
the insulation layer comprises a resin composition including:
a base resin containing polyolefin, and
an inorganic filler;
the inorganic filler comprises:
a core part containing Mg(OH)$_2$, and
a covering part containing a plurality of MgO particles provided so as to cover an outer periphery of the core part;
content of the inorganic filler in the resin composition is 0.1 parts by mass or more and 5 parts by mass or less with respect to 100 parts by mass of the base resin; and
a volume fraction of Mg(OH)$_2$ in one particle of the inorganic filler is 10% or more and less than 50%.

2. The direct-current power cable according to claim 1, wherein a surface of the covering part has irregularities corresponding to external shapes of the plurality of MgO particles.

3. The direct-current power cable according to claim 1, wherein the inorganic filler is inorganic powder obtained by baking Mg(OH)$_2$ as a raw material.

4. The direct-current power cable according to claim 1, wherein a mean volume diameter of the inorganic filler is 5 μm or less.

5. A method for producing the direct-current power cable according to claim 1.

6. A direct-current power cable, comprising:
a conductor, and
an insulation layer provided so as to cover an outer periphery of the conductor;
wherein
the insulation layer comprises a resin composition including:
a base resin containing polyolefin, and
an inorganic filler;
the inorganic filler comprises:
a core part containing Mg(OH)$_2$, and
a covering part containing a plurality of MgO particles provided so as to cover an outer periphery of the core part; and
a volume resistivity of a sheet of an insulation layer is $1 \times 10^{15}$ Ω·cm or more, as measured under conditions at a temperature of 90° C. and a direct-current field of 80 kV/mm, when the sheet of the insulation layer having a thickness of 0.15 mm is formed by immersing the direct-current power cable in a water bath at a temperature of 40° C. for 30 days, and thereafter peeling the insulation layer of the direct-current power cable.

7. A direct-current power cable, comprising:
a conductor, and
an insulation layer provided so as to cover an outer periphery of the conductor;
wherein
the insulation layer comprises a resin composition including:
a base resin containing polyolefin, and
an inorganic filler;
the inorganic filler comprises:
a core part containing Mg(OH)$_2$, and
a covering part containing a plurality of MgO particles provided so as to cover an outer periphery of the core part; and
a dielectric breakdown electric field strength of a sheet of an insulation layer is 250 kV/mm or more, as measured under a condition at a temperature of 90° C., when the sheet of the insulation layer having a thickness of 0.15 mm is formed by immersing the direct-current power cable in a water bath at a temperature of 40° C. for 30 days, and thereafter peeling the insulation layer of the direct-current power cable.

8. A direct-current power cable, comprising:
a conductor, and
an insulation layer provided so as to cover an outer periphery of the conductor;
wherein
the insulation layer comprises a resin composition including:
a base resin containing polyolefin, and
an inorganic filler;

the inorganic filler comprises:
  a core part containing $Mg(OH)_2$, and
  a covering part containing a plurality of MgO particles provided so as to cover an outer periphery of the core part; and
a field enhancement factor FEF of a sheet of an insulation layer is less than 1.15, as obtained by the following formula (1), when the sheet of the insulation layer having a thickness of 0.15 mm is formed by immersing the direct-current power cable in a water bath at a temperature of 40° C. for 30 days, and thereafter peeling the insulation layer of the direct-current power cable, and a direct-current field of 50 kV/mm is applied to the sheet of the insulation layer under conditions at a temperature of 30° C. and an atmospheric pressure:

$$FEF=E_1/(V_0/T) \tag{1}$$

wherein $V_0$ represents a voltage (kV) applied to the sheet, T represents a thickness (mm) of the sheet, and $E_1$ represents a maximum electric field (kV/mm) in the sheet.

9. A direct-current power cable, comprising:
a conductor, and
an insulation layer provided so as to cover an outer periphery of the conductor;
wherein
  the insulation layer comprises a resin composition including:
    a base resin containing polyolefin, and
    an inorganic filler containing at least MgO;
  the inorganic filler exhibits no peak derived from $Mg(OH)_2$ but a peak derived from MgO when energy spectra of photoelectrons emitted from a surface side of the inorganic filler are measured by X-ray photoelectron spectroscopy method,
  whereas the inorganic filler exhibits a peak derived from $Mg(OH)_2$ when an infrared spectrum of the inorganic filler is measured by Fourier transform infrared spectroscopy method based on infrared rays penetrating the inorganic filler; and
  a volume fraction of $Mg(OH)_2$ in one particle of the inorganic filler is 10% or more and less than 50%.

* * * * *